United States Patent [19]
Koschinat

[11] Patent Number: 5,445,250
[45] Date of Patent: Aug. 29, 1995

[54] BRAKE SHOE MOUNTING WITH BALL BEARINGS FOR SWIVELLING

[75] Inventor: Hubert B. Koschinat, Hösbach, Germany

[73] Assignee: Otto Sauer Achsenfabrik Keilberg, Bessenbach-Keilberg, Germany

[21] Appl. No.: 145,298

[22] Filed: Nov. 3, 1993

Related U.S. Application Data

[63] Continuation of Ser. No. 782,364, Oct. 24, 1991, abandoned.

[30] Foreign Application Priority Data

Oct. 24, 1990 [DE] Germany ............ 40 33 738.3

[51] Int. Cl.$^6$ ............................................. F16D 65/09
[52] U.S. Cl. ..................... 188/328; 188/341; 384/2; 192/76
[58] Field of Search ............ 188/325, 327, 328, 331, 188/341, 326, 329, 330, 332, 335, 340, 342, 343; 384/2, 475; 192/76, 78

[56] References Cited

U.S. PATENT DOCUMENTS

| | | | |
|---|---|---|---|
| 1,908,745 | 5/1933 | Ford | 188/327 |
| 2,351,040 | 6/1944 | Hawley | 188/368 |
| 2,519,952 | 8/1950 | Campbell et al. | 188/331 |
| 4,216,850 | 8/1980 | Kizaki | 188/341 |
| 4,334,720 | 6/1982 | Signer | 384/475 |
| 4,456,103 | 6/1984 | Muscat | 188/326 |
| 4,679,667 | 7/1987 | Zawodni | 188/327 X |
| 4,936,426 | 6/1990 | Chatman et al. | 188/341 X |

FOREIGN PATENT DOCUMENTS

| | | | |
|---|---|---|---|
| 0078115 | 5/1983 | European Pat. Off. | |
| 0331532 | 9/1989 | European Pat. Off. | 188/327 |
| 780738 | 5/1935 | France | |
| 0047286 | 3/1937 | France | 188/327 |
| 2291411 | 6/1976 | France | |
| 1795032 | 6/1959 | Germany | |
| 1945792 | 2/1962 | Germany | |
| 2245134 | 4/1974 | Germany | |
| 2721707 | 12/1977 | Germany | |
| 2748335 | 5/1979 | Germany | |
| 8806286.4 | 9/1988 | Germany | |

Primary Examiner—Josie A. Ballato
Attorney, Agent, or Firm—Wenderoth, Lind & Ponack

[57] ABSTRACT

A brake shoe mounting for a vehicle drum brake hinges brake shoes to a brake anchor member to swivel around axes that are substantially parallel to the brake drum axis. To simplify the assembly and disassembly of the brake shoes and to improve the adaptation of surfaces of brake linings to the inner surface of the brake drum that expands under stress, the hinging of the brake lining shoes to the anchor member is achieved by ball bearings.

23 Claims, 3 Drawing Sheets

BRAKE SHOE MOUNTING WITH BALL BEARINGS FOR SWIVELLING

This application is a continuation of now abandoned application Ser. No. 07/782,364, filed Oct. 24, 1991.

BACKGROUND OF THE INVENTION

The invention relates to a brake shoe mounting arrangement for a vehicle drum brake, wherein brake shoes or lining carriers are hinged to a brake anchor so as to swivel with respect thereto around axes that are substantially parallel to the axis of the brake drum.

In a drum brake for vehicles, in particular motor vehicles, e.g. as disclosed in DE-GM 88 06 286, the brake shoes are mounted on a brake anchor by means of anchor pins to swivel only in a plane parallel to a backing plate. Such a mounting arrangement demands a relatively high cost of manufacture and assembly with special tools. When operating the brake, the brake linings attached to the brake shoes press against the inside of the brake drum. Due to this pressure the brake drum is expanded radially. This expansion is not uniform in the axial direction, but rather increases in the direction of the open side of the brake drum. This leads to the brake shoes abutting non-uniformly against the inner surface of the brake drum and correspondingly to the contact pressure being distributed non-uniformly and thus to a deterioration in braking performance.

SUMMARY OF THE INVENTION

The above discussion in mind, it is the object of the present invention to provide a brake shoe mounting of the aforementioned type, whereby by simple manufacture and assembly a nonuniform abutment of the brake shoes against the inner surface of the brake drum is largely avoided.

This object is achieved in accordance with the invention in that the hinging of the brake shoes to the brake anchor member is achieved by ball bearings. Such ball bearings enable in an advantageous manner the possibility of swivelling the brake shoes not only around axes parallel to the brake drum axis, as is the case with known hinged mountings, but also around the center point of each ball bearing in any arbitrary direction, and in particular around an axis that is perpendicular to such former parallel swivel axes. Due to this capability of unrestricted swivelling of the brake shoes, uniform abutment of the brake linings against the inner surface of the brake drum and thus uniform contact pressure over the entire width of the brake linings can be guaranteed under all load conditions. Manufacture and assembly of the invention is simple and inexpensive. This especially is true since the ball bearings employed for the invention are known from the ball bearing industry and can be obtained inexpensively as a mass produced product, and further can be ball bearings that have exceeded the tolerance limit for precision ball bearings and that otherwise would be scrapped.

The ball bearings can be retained undetachably in bearing seats of the anchor member or of end members of the shoes. Thus, for example, the respective bearing seat can surround or enclose the ball bearing by more than 180°. The assembly and disassembly of the mounting thus is further significantly facilitated when changing brake shoes.

The brake shoes can be held in a simple manner by means of a spring clamp that can be slipped on while supporting the ball bearings on the anchor member. Such a spring clamp to hold the ball bearings together offers the advantage of being both inexpensive and also simple to manipulate. If the spring clamp is designed to snap onto the brake shoes, the assembly and disassembly of the brake shoes is further simplified. The manufacture of the brake shoes becomes even less expensive if the end members of the brake shoes are used as latching bodies for the spring clamp. If the spring clamp is designed, e.g. as a leaf spring whose width is slightly smaller than the distance between two ribs forming each of the brake shoes, and the depressions are provided in regions of outer surfaces of the end members of the brake shoes between the ribs, the spring clamp can be accurately positioned and ensured against sliding laterally from the latched position. Another advantageous embodiment of the invention provides that the spring clamp can be slipped from the top of the end members of the brake shoes while reaching under the anchor member of the backing plate. Thus, the spring clamp is readily accessible for disassembly and assembly. End portions of the spring clamp can be S-shaped, thus improving the spring characteristics. In addition, the spring characters easily can be changed by increasing or decreasing spring loops of such end portions. The ends of the spring clamp can be extended in an advantageous manner beyond the end portions of the spring clamp that fit in the depressions, so that the spring clamp can be readily attached and detached. Another embodiment of the invention provides that the ends of the spring have bore holes through which can be inserted an assembly tool, thus further facilitating attachment and detachment of the spring clamp.

To counteract as much as possible the wear of the mounting of the invention, it is further provided that a recess is provided in the apex region of each of the respective bearing seats of the brake shoes and/or the anchor member. Such apex region is located at the area of application of force by the spring clamp. The region of maximum compression stress on the ball bearing and bearing seat thus is recessed.

To lubricate the ball bearing and/or to lift the ball bearing from the bearing seat, it is advantageous if a grease channel or ejection channel opens into each respective bearing seat surface of the anchor member or brake shoe. Grease can be fed by means of such grease channel or ejection channel to the friction surfaces of the ball bearing and bearing seat, or a tool to remove the ball bearing from the bearing seat can be inserted through such channel. In another advantageous embodiment of the invention, the grease or ejection channel is designed as a slot, a feature that significantly facilitates disassembly of the ball bearings. The grease channel or ejection channel opens expediently into the recess of the bearing seat and thus serves as an additional grease chamber.

For lateral stability of the brake shoes, it is advantageous if, according to another feature of the invention, each ball bearing support is formed by two ball bearings positioned side-by-side, seen in a direction parallel to the brake drum axis.

Since the brake shoes can also be tilted from the normal plane thereof due to the support by the ball bearings, it is advantageous if free ends of brake shoes are guided, e.g. by an S-shaped cam while being prevented from tilting around an axis extending perpendicular to the brake drum axis.

It is further proposed with the invention that the anchor member and/or the end members of the brake shoes be designed as forged elements. By manufacturing the end members of the brake shoes separately, a significantly better utilization of material can be achieved during manufacture of the brake shoes, since customarily a brake shoe with an end member is manufactured as one piece. Thus, from a 10 m long steel plate only 130 articles of the known brake shoe with an end member can be manufactured, whereas in the case of a steel plate of the same length but shorter width, 168 articles of brake shoes according to the invention can be produced.

BRIEF DESCRIPTION OF THE DRAWINGS

Other objects, features, advantages and possible applications of the present invention will be apparent from the following description of embodiments thereof, with reference to the accompanying drawings, wherein all described and/or illustrated features form by themselves or in any arbitrary combination the subject matter of the present invention, and wherein.

DETAILED DESCRIPTION OF THE INVENTION

Figure 1A:
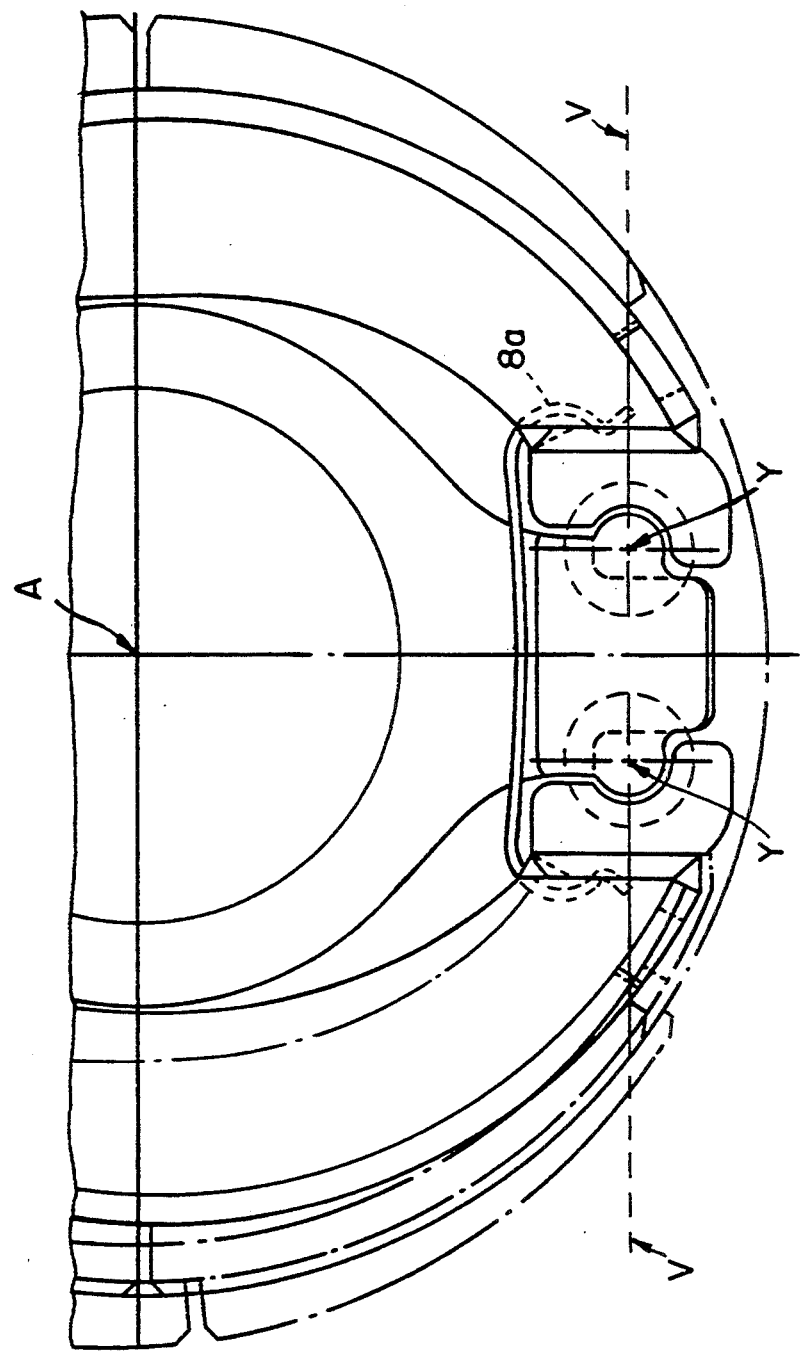
FIG. 1a is a schematic end view, axially of a vehicle axle, of an embodiment of a brake shoe mounting of the invention.
Figure 1B:
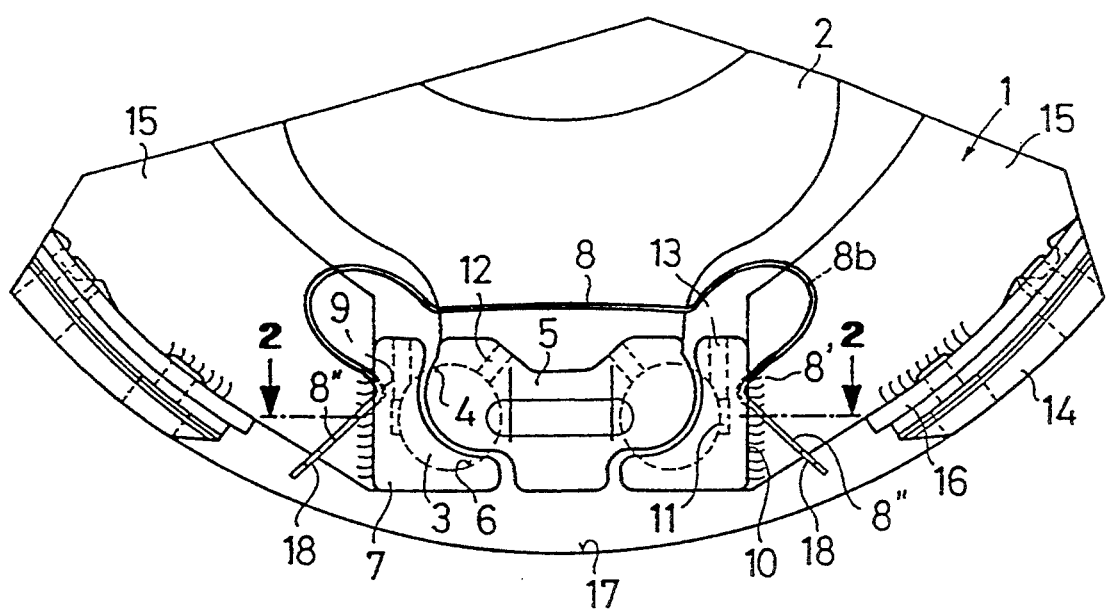
FIG. 1b is a partial schematic side view of a brake shoe mounting according to a modified embodiment of the invention.
Figure 2:
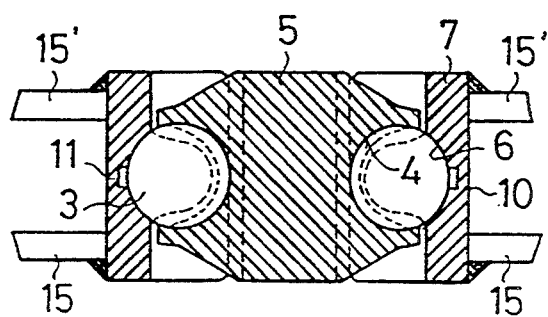
FIG. 2 is a schematic sectional view of the brake shoe mounting according to FIG. 1b taken along line 2—2 therein.

FIGS. 1b and 2 show an arrangement of ball bearings to hingedly mount brake lining carriers or brake shoes 1 to brake support assembly including an anchor member 5 fixed to a brake carrier or backing plate 2 of a vehicle drum brake assembly. Each of the two brake shoes 1 includes two parallel ribs 15, 15' an end member 7 attached to both ribs and connecting the ribs and designed as a forged member, and a lining support plate 16 on which is mounted interchangeably a brake lining 14 that can be pressed by spreading the brake shoes 1 against a brake drum inner surface 17 to achieve a braking action. End members 7 of brake shoes 1 have concave partial spherical surfaces 6 forming bearing seats. Anchor member 5, also forged, is mounted on backing plate 2 and has at opposite ends thereof concave partial spherical surfaces 4 forming bearing seats. A ball bearing 3 seats between each pair of adjacent seats 4, 6.

A spring clamp 8 in the form of a leaf spring is positioned above anchor member 5 and has at opposite ends thereof bent off end portions 8' that fit in respective catch depressions 9 formed in outer surfaces 10 of the end members 7 of the brake shoes 1. Outer surfaces 10 face away from member 5 and away from each other in opposite directions. Thus, spring clamp 8 holds together the entire mounting. The width of spring clamp 8 is slightly smaller than the distance between the ribs, 15, 15'. Thus, spring clamp 8 extends between ribs 15, 15' into the depressions 9 and is ensured against lateral displacement. Also, the brake shoes 1 are prevented from hinging downwardly unintentionally during assembly.

FIGS. 1a and 1b show various embodiments of the spring clamp 8. Thus, the ends of the spring clamp 8 can be merely S-shaped as shown at 8a in FIG. 1a or can be shaped as spring loops 8b. Spring clamp ends 8" can project beyond end regions 8' and can be provided with tool holes 18.

Anchor member 5 and end members 7 have formed therein respective grease channels 12, 13 leading to surfaces 4, 6. Such channels can be boreholes but also can be forged slots. In addition, end members 7 have formed therein respective recesses 11 at outer apex positions of the respective surfaces 6 thereof and through which grease can flow from the grease channel 13 to the ball bearing. In the region of the recess 11 the grease channel 13 opens tangentially to the surface 6. Thus, channel 13 can serve as an ejection channel for insertion therethrough of a tool to enable disassembly and removal of ball bearing 3. Whereas the ball bearing 3 engages loosely with the surface 6, such ball bearing is caught or retained undetachably in the surface 4 of the member 5 by bending over side edges of member 5 to encompass or enclose more than 180° of the ball bearing. When the grease channels 12, 13 are designed as slots, the ball bearings are disassembled by bending open such enclosures. To enable such operation, the length of each slot corresponds to at least half of the diameter of the ball bearing.

Figure 3:
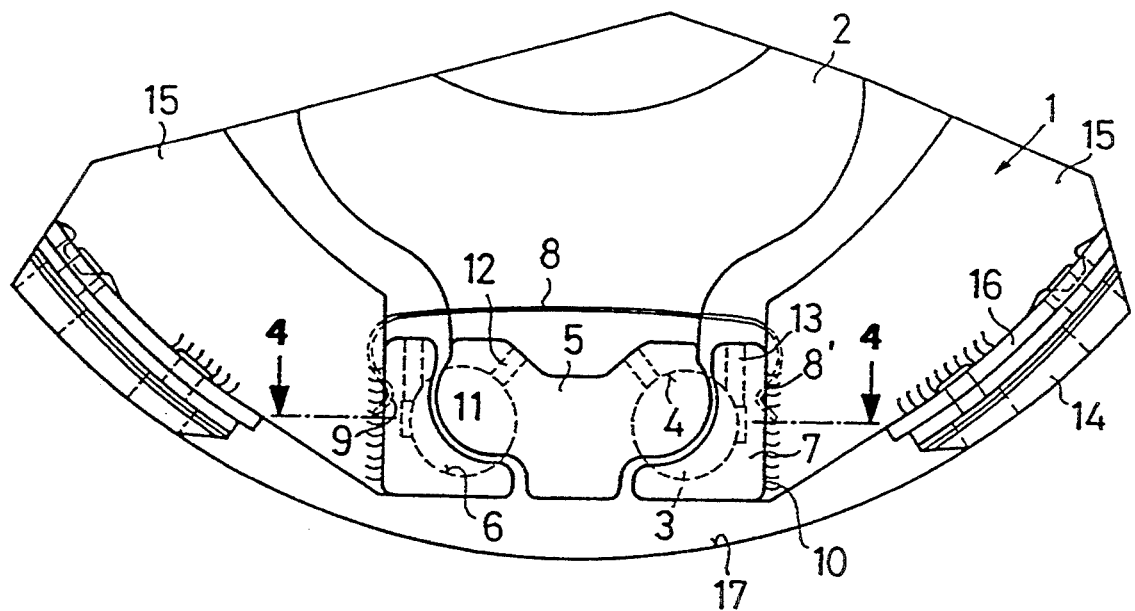
FIG. 3 is a partial schematic side view of a brake shoe mounting of another embodiment of the invention.
Figure 4:
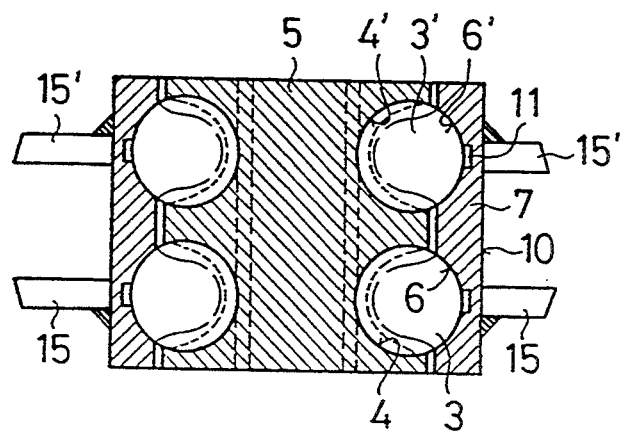
FIG. 4 is a schematic sectional view of the brake shoe mounting according to FIG. 3 taken along line 4—4 thereof.

FIGS. 3 and 4 show another embodiment of the invention, in which, in contrast to the embodiment in FIGS. 1b and 2, each brake shoe 1 is supported and braced by means of two ball bearings 3, 3' against the anchor member 5. Each of the anchor members 5 and the end members 7 have two side-by-side, axially spaced bearing seats 4, 4' or 6, 6'.

The brake linings 14 will contact uniformly, due to the ball bearing mounting arrangement of the invention, against the possibly variable contour of the brake drum inner surface 17 upon spreading apart the two brake shoes 1, e.g. by rotation of an S-shaped cam acting on the upper free ends of the brake shoes 1 and on which the brake shoes 1 are guided against lateral tilting. That is, shoes 1 are allowed to tilt about ball bearings 3 in any relative direction, and particularly about respective axes V (FIG. 1a) perpendicular to respective axes Y that extend through ball bearings 3 and that are parallel to axis A of the brake drum.

I claim:

1. In a brake shoe mounting arrangement for a vehicle drum brake, wherein first ends of a pair of brake shoes are hingedly mounted to a brake support by mounting means, the improvement wherein said mounting means comprises:

ball bearing means, operatively associated with said brake support and with said first end of each said brake shoe, for enabling each said brake shoe to swivel around a respective first axis extending substantially parallel to an axis of a drum of said drum brake and also to swivel around a respective second axis extending perpendicular to said first axis.

2. The improvement claimed in claim 1, wherein said first ends of said brake shoes are adjacent ends thereof.

3. The improvement claimed in claim 2, wherein said second axes of said brake shoes are coaxial.

4. The improvement claimed in claim 1, wherein said brake support comprises a backing plate having fixed thereto an anchor member.

5. The improvement claimed in claim 4, wherein said first end of each said brake shoe includes an end member.

6. The improvement claimed in claim 5, wherein said ball bearing means comprises, for each said brake shoe, at least one ball bearing seated in concave partial spherical surfaces defining bearing seats formed in said anchor member and in the respective said end member.

7. The improvement claimed in claim 6, comprising only one said ball bearing for each said brake shoe.

8. The improvement claimed in claim 6, comprising plural, axially spaced ball bearings for each said brake shoe.

9. The improvement claimed in claim 6, wherein each said ball bearing is retained undetachably in said bearing seat in one member selected from said anchor member and the respective said end member.

10. The improvement claimed in claim 6, further comprising a spring clamp urging said brake shoes toward said anchor member to brace said ball bearings between said end members and said anchor member.

11. The improvement claimed in claim 10, wherein said spring clamp has opposite end portions latched to catches of respective said brake shoes, said catches facing in opposite directions.

12. The improvement claimed in claim 11, wherein said catches comprise depressions formed in respective outer surfaces of said end members.

13. The improvement claimed in claim 12, wherein each said brake shoe includes two parallel, axially spaced ribs, and said spring clamp comprises a leaf spring having a width slightly less than the spacing between said two ribs.

14. The improvement claimed in claim 13, wherein each said depression is located between the respective said two ribs.

15. The improvement claimed in claim 12, wherein said spring clamp is dimensioned to be latched onto said end members from a direction radially outwardly from the axis of the drum of said drum brake.

16. The improvement claimed in claim 11, wherein said end portions of said spring clamp are shaped as loops.

17. The improvement claimed in claim 11, wherein said spring clamp has opposite ends projecting beyond said end portions.

18. The improvement claimed in claim 10, further comprising, for each said ball bearing, a recess formed in at least one of the respective said bearing seats thereof, said recess being located at an apex region of said bearing seat receiving force from said spring clamp.

19. The improvement claimed in claim 18, further comprising, for each said ball bearing, a grease channel extending through one of said anchor member and the respective said end member and opening onto said bearing seat thereof.

20. The improvement claimed in claim 19, wherein said grease channel is in the form of a slot.

21. The improvement claimed in claim 19, wherein said grease channel opens into said recess.

22. The improvement claimed in claim 6, wherein at least one of said anchor member and said end members comprises a forged member.

23. The improvement claimed in claim 1, wherein said brake shoes have upper and lower ends and said first ends of said brake shores are said lower ends thereof.

* * * * *